(12) United States Patent
Edwards et al.

(10) Patent No.: US 6,363,693 B1
(45) Date of Patent: Apr. 2, 2002

(54) PROCESS FOR PRODUCING A WATER SOLUBLE PACKAGE

(75) Inventors: David Brian Edwards, Stevenage; William John McCarthy, Shaftesbury, both of (GB)

(73) Assignee: Unilever Home & Personal Care, USA, Greenwich, CT (US)

(*) Notice: Subject to any disclaimer, the term of this patent is extended or adjusted under 35 U.S.C. 154(b) by 0 days.

(21) Appl. No.: 09/525,711

(22) Filed: Mar. 14, 2000

(30) Foreign Application Priority Data

Mar. 17, 1999 (GB) .............................. 9906169

(51) Int. Cl.$^7$ .............................................. B65B 11/58
(52) U.S. Cl. ........................... 53/449; 53/428; 53/469
(58) Field of Search ..................... 53/170, 173, 449, 53/467, 473, 476, 477; 206/5, 521, 524.7, 592, 594; 220/403, 404, 409, 413, 420, 425, 462, 359

(56) References Cited

U.S. PATENT DOCUMENTS

| | | | |
|---|---|---|---|
| 2,377,188 A | | 5/1945 | Weisman .................. 99/77.1 |
| 3,958,394 A | | 5/1976 | Mahaffy et al. ............ 53/112 |
| 4,398,380 A | | 8/1983 | Takamura .................. 53/390 |
| 4,416,791 A | | 11/1983 | Haq ........................... 252/90 |
| 4,562,717 A | | 1/1986 | Shimizu et al. ............ 72/347 |
| 4,610,799 A | | 9/1986 | Wilsberg et al. ........... 252/90 |
| 4,681,228 A | * | 7/1987 | Kerry et al. ................. 53/170 |
| 4,846,992 A | | 7/1989 | Fonsmy ...................... 252/90 |
| 4,969,927 A | | 11/1990 | Schumann et al. ........... 8/159 |
| 4,971,748 A | | 11/1990 | Sado et al. ................ 264/553 |
| 4,973,416 A | | 11/1990 | Kennedy ..................... 252/90 |
| 5,224,601 A | * | 7/1993 | Gouge et al. ............ 206/524.7 |
| 5,227,177 A | | 7/1993 | Reil et al. ................. 425/388 |
| 5,384,364 A | * | 1/1995 | Besse et al. ................ 252/90 |
| 5,394,603 A | | 3/1995 | Reil et al. ................. 29/463 |
| 5,464,097 A | * | 11/1995 | Edwards et al. ........ 206/524.7 |
| 5,665,824 A | | 9/1997 | Chang et al. .............. 525/185 |

FOREIGN PATENT DOCUMENTS

| | | |
|---|---|---|
| BE | 9700361 | 12/1986 |
| DE | 93 03 456 | 6/1993 |
| DE | 19521 140 | 12/1996 |
| DE | 298 01 621 | 4/1998 |
| EP | 0 079 712 | 5/1983 |
| EP | 0 157 612 | 10/1985 |
| EP | 0 266 583 | 5/1988 |
| EP | 0 272 796 | 6/1988 |
| EP | 158 464 B1 | 7/1989 |
| EP | 0 343 069 | 11/1989 |
| EP | 0 343 070 | 11/1989 |
| EP | 0 347 221 | 12/1989 |
| EP | 0 366 231 | 5/1990 |
| EP | 0 373 395 | 6/1990 |
| EP | 0 518 689 B1 | 12/1992 |
| EP | 0 291 198 | 11/1993 |
| EP | 0 608 910 | 3/1994 |
| EP | 0 593 952 | 4/1994 |
| EP | 0 389 513 | 7/1994 |
| EP | 0 700 989 | 3/1996 |
| EP | 0 718 199 | 6/1996 |
| EP | 0 746 514 | 12/1996 |
| EP | 0 748 673 | 12/1996 |
| EP | 0 941 939 | 9/1999 |
| FR | 2 601 930 | 1/1988 |
| FR | 2 724 388 | 3/1996 |
| GB | 631484 | 11/1949 |
| GB | 989 350 | 4/1965 |
| GB | 1 381 376 | 1/1975 |
| GB | 2 060 544 | 5/1981 |
| GB | 2 090 603 | 7/1982 |
| GB | 2 118 961 | 11/1983 |
| GB | 2 211 196 | 6/1989 |
| GB | 2 221 158 | 1/1990 |
| GB | 2 257 388 | 1/1993 |
| GB | 2 259 883 | 3/1993 |
| GB | 2 305 931 | 4/1997 |
| WO | 89/04282 | 5/1989 |
| WO | 92/17382 | 10/1992 |
| WO | 96/00251 | 1/1996 |
| WO | 96/29189 | 9/1996 |
| WO | 97/00282 | 1/1997 |
| WO | 97/27743 | 8/1997 |

OTHER PUBLICATIONS

PCT International Search Report in a PCT application PCT/EP 00/01944.
PCT International Search Report in a PCT application PCT/EP 00/01648.
PCT International Search Report in a PCT application PCT/EP 00/01647.
PCT International Search Report in a PCT application PCT/EP 00/01943.
PCT International Search Report in a PCT application PCT/EP 00/01942.
Derwent Abstract of DE 12 87 502.
Derwent Abstract of JP9087105, Mar. 31, 1997.
Derwent Abstract of FR 2684594, Jun. 11, 1993.
Derwent Abstract of FR 2675734, Oct. 30, 1992.
GB Search Report in Patent Application #9906175.6.
GB Search Report in Patent Application #9906176.4.
GB Search Report in Patent Application #9906179.8.
GB Search Report in Patent Application #9906171.5.

* cited by examiner

*Primary Examiner*—Rinaldi I. Rada
*Assistant Examiner*—Hemant M Desai
(74) *Attorney, Agent, or Firm*—Rimma Mitelman

(57) ABSTRACT

A process for producing a package comprising a composition contained within a closed water soluble envelope comprises the initial steps of moulding a first sheet of water soluble material to form at least one recess adapted to contain the composition, placing the composition in the at least one recess, placing a second sheet of water soluble material across the recess, and sealing the first sheet to the second sheet to form a continuous closed seal around the recess thereby closing the package. The or each closed package is conditioned in an environment of raised relative humidity for a period of time prior to or during the packaging of the package within a secondary pack. The secondary pack includes a moisture barrier to maintain the package within the secondary pack in a conditioned form.

7 Claims, No Drawings

PROCESS FOR PRODUCING A WATER SOLUBLE PACKAGE

INTRODUCTION

The invention relates to a process for producing a water-soluble package. In particular the invention relates to a process for producing a thermoformed water-soluble package.

Water-soluble packages are known in the detergent and agrochemical industries and generally comprise either vertical form-fill-seal (VFFS) envelopes or thermoformed envelopes. In one of the VFFS processes, a roll of water soluble film is sealed along its edges to form a tube, which tube is the heat sealed intermittently along its length to form individual envelopes which are filled with product and heat sealed. The thermoforming process generally involves moulding a first sheet of water soluble film to form one or more recesses adapted to retain a composition, such as for example a solid agrochemical composition, placing the composition in the at least one recess, placing a second sheet of water soluble material over the first so as to cover the or each recess, and heat sealing the first and second sheets together at least around the recesses so as to form one or more water soluble packages.

Generally, water-soluble packages suffer a number of disadvantages. First, as the packages are susceptible to moisture, the composition, which can be contained within the package, is limited. Secondly, the storage and transport of such packages must be carefully controlled as humidity in the atmosphere can weaken the structural integrity of the formed packages.

It is an object of the present invention to overcome at least some of the above disadvantages.

STATEMENT OF INVENTION

According to the invention there is provided a process for forming a water soluble package, the process being characterised in that the formed packages are conditioned in an atmosphere of raised Relative Humidity (RH) for a period of time. In the process of the invention, the package may be formed by any convenient method such as VFFS, thermoforming, HFFS and the like. In one process according to the invention the packages are conditioned, ideally after sealing, in an environment having a RH greater that 50% at ambient temperature, preferably between 60 and 80% RH, ideally between 65 and 70% RH. Typically, the temperature of the conditioning environment will be in the region of 15 to 25 degrees C, ideally about 20 degrees C. In one process according to the invention, the packages are conditioned for a time sufficient at least partially to plasticise the water soluble films of the packages, thereby rendering the packages less brittle and more impact resistance. The time required will vary according to the RH and the temperature but will typically be between about 1 and about 10 minutes.

The process includes a step of packaging the conditioned packages within a secondary pack. In this regard the secondary pack should include at least a partial moisture barrier such as polypropylene, polyester, aluminium foil, PVDC, waxed cardboard and the like. Typically the MVTR of the material of the secondary packs is in the region of 1 to 20 g/m2/24 hours. In one preferred process of the invention, the conditioned packages are packed into the secondary pack in the conditioning environment, that is to say, the packages are packed into the secondary pack in an atmosphere of raised relative humidity. The choice of the secondary pack may be chosen from materials which are well known to a person skilled in the packaging field, given the requirement of preventing or inhibiting moisture transmission. Examples of suitable packaging would be wax or polyethylene lined cardboard boxes. It has been found that when water-soluble packages are suitably conditioned, the water-soluble films have a greater impact resistance, and hence will be more sturdy and resilient in transport.

In one preferred process of the invention, at least some of the initial steps of the process leading up to the sealing of the package are carried out in an atmosphere having a RH lower than that of the conditioning atmosphere. Suitably this preconditioning of the packages may be carried out in an atmosphere having a RH less than 50%, typically approximately 40% RH. Ideally this preconditioning is carried out during the forming, filling and sealing steps. It has been found that such pre-conditioning of the film during the forming, filling and sealing stages effectively stiffens up the film and allows for easier handling and processing.

When the process of the invention involves thermoforming the packages, the recess or recesses formed in the first film of water-soluble material may be retained in a formed shape by means of the application of a vacuum. In this regard the recess or recesses may be formed in the first sheet by heating the film over a die having one or more cavities, wherein once heated the film falls into the cavities and assumes the shape of the cavity. The cavities thus may include means for pulling a vacuum on the formed film. The vacuum in this instance may be maintained throughout the subsequent filling and sealing steps. Where the die includes a number of cavities, the process will include the additional steps of cutting the formed packages and ejecting the cut individual packages from the die.

In a preferred embodiment of the invention the film is a polyvinyl alcohol, or modified polyvinyl alcohol, film. Typically, the composition is a fluent composition such as for example a liquid, gel or paste. When the composition is a liquid, ideally the liquid will have a viscosity of up to 1000 centipoise, when measured at at a shear rate of 105/second at 20 degrees C. Preferably, each package will contain up to one litre of composition, ideally between 10 and 50 mls, most preferably between 15 and 30 mls. In an envisaged embodiment, the composition will include detergent suitable for use in the machine washing of laundry or dishes.

The invention also relates to water-soluble packages obtainable by the process of the invention, and the use of such packages in the machine washing of laundry and dishes.

DETAILED DESCRIPTION OF THE INVENTION

The invention will be more clearly understood from the following description of an embodiment thereof, given by way of example only.

EXAMPLE

In this example a thermoforming process is described where a number of packages according to the invention are produced from a sheet of water soluble material, namely polyvinyl alcohol supplied under reference number CC8534 by Chris Craft. Recesses are formed in the sheet using a forming die having a plurality of cavities with dimensions corresponding generally to the dimensions of the packages to be produced. Further, a single heating plate is used for moulding the film for all the cavities, and in the same way a single sealing plate is described.

A first sheet of polyvinyl alcohol film is drawn over a forming die so that the film is placed over the plurality of forming cavities in the die. Each cavity is generally dome shape having a round edge, the edges of the cavities further being radiussed to remove any sharp edges which might damage the film during the forming or sealing steps of the process. Each cavity further includes a raised surrounding flange. In order to maximise package strength, the film is delivered to the forming die in a crease free form and with minimum tension. In the forming step, the film is heated to 100 to 120 degrees C, preferably approximately 110 degrees C, for up to 5 seconds, preferably approximately 700 micro seconds.

A heating plate is used to heat the film, which plate is positioned to superpose the forming die. The plate can be flat but in this case includes a plurality of concave depressions which correspond to the recesses on the forming die. During this preheating step, a vacuum is pulled through the pre-heating plate to ensure intimate contact between the film and the pre-heating plate, this intimate contact ensuring that the film is heated evenly and uniformly (the extent of the vacuum is dependant of the thermoforming conditions and the type of film used, however in the present context a vacuum of less than 0.6 bar was found to be suitable) Non-uniform heating results in a formed package having weak spots. In addition to the vacuum, it is possible to blow air against the film to force it into intimate contact with the preheating plate.

The thermoformed film is moulded into the cavities by blowing or sucking the film off the heating plate and into the cavities on the die, forming a plurality of recesses in the film which, once formed, are retained in their thermoformed orientation by the application of a vacuum through the walls of the cavities. This vacuum is maintained at least until the packages are sealed. Once the recesses are formed and held in position by the vacuum, the composition, in this case a liquid detergent, is added to each of the recesses. A second sheet of polyvinyl alcohol film is then superposed on the first sheet covering the filled recesses and heat-sealed thereto using a heating plate. In this case the heat sealing plate, which is flat, preferably operates at a temperature of about 140 to 160 degrees centigrade, and ideally contacts the films for 1 to 2 seconds and with a force of 8 to 30 kg/cm2, preferably 10 to 20 kg/cm2. The raised flanges surrounding each cavity ensures that the films are sealed together along the flange to form a continuous closed seal. The radiussed edge of each cavity is typically at least partly formed a by a resiliently deformable material, such as for example silicone rubber. This results in reduced force being applied at the inner edge of the sealing flange to avoid heat/pressure damage to the film.

Once sealed, the packages formed are separated from the web of sheet film using cutting means. At this stage it is possible to release the vacuum on the die, and eject the formed packages from the forming die. In this way the packages are formed, filled and sealed while nesting in the forming die. In addition they may be cut while in the forming die as well.

During the forming, filling and sealing steps of the process, the relative humidity of the atmosphere is controlled at ca. 50%. This is done to maintain the heat sealing characteristics of the film. When handling thinner films, it may be necessary to reduce the relative humidity to ensure that the films have a relatively low degree of plasticisation and as such tend to be stiffer resulting in easier handling. The actual specific RH of the atmosphere needed will vary according to the temperature of the environment and the type of film used, however for temperatures in the region of 20 degrees C, the RH should preferably be in the region of 30 to 50% depending on the thickness and elasticity of the film.

The sealed packages are suitably conditioned after sealing and prior to and during packaging within a secondary packaging. Thus, once sealed the RH of the atmosphere is raised relative to the RH of the atmosphere prior to sealing. The actual RH required adequately to condition the packages depends to a large extent on the temperature of the environment, and the type of film used. As an example, considering a temperature of 20 degrees C, and a conventional water soluble film having a thickness of between 50 to 80 microns, the RH should be raised to greater than 50%, preferably about 70 to 80%. The formed packages should be conditioned in this atmosphere for a period of time sufficient to plasticise the water-soluble film to a degree where it is rendered less brittle and more impact resistant. Ideally, the packages are packed within the secondary pack within the conditioning environment so that the conditioned atmosphere is sealed into secondary packs thus allowing the packages equilibrate further with the conditioned atmosphere. In this regard the secondary pack should include a moisture barrier, preferably a moisture barrier having a MVTR in the region of 1 to 20 g/m2/24 hours. Suitable packaging substrates having MVTR values in this range will be known to those skilled in the art. The above pre-sealing and post-sealing conditioning conditions are also applicable to packages formed using other methods such as the VFFS process of the prior art.

TEST 1

| | |
|---|---|
| Objective | To establish the hygroscopic nature of water soluble film and to demonstrate that a moisture equilibrium is established |
| Method | A number of water soluble film dome shaped packages produced in a thermoforming process described above were placed in an hermetically sealed chamber. These "domes" had been kept sealed in polythene bags since manufacture to ensure that they had not absorbed enough moisture from the atmosphere to render any hygroscopic nature insignificant.<br>The chamber had previously been conditioned by the addition of a constant humidity solution, which raised, and held the humidity within the chamber to about 60% r.h. at 20° C. When the packages were added this constant humidity solution was removed.<br>A hygrometer was present within the chamber at all times and the relative humidity indicated was read and noted at day or ½ daily intervals |

Results

| No | Time (Days) | Temp ° C. | % r.h. | No | Time (Days) | Temp ° C. | % r.h. |
|---|---|---|---|---|---|---|---|
| 1 | 0 | 20 | 60 | 2 | 0 | 22 | 64 |
|   | 1 | 18 | 42 |   | ½ | 20 | 55 |
|   | 1½ | 17 | 38 |   | 1 | 17 | 38 |
|   | 2 | 20 | 38 |   | 1½ | 19 | 36 |
|   | 2½ | 17 | 37 |   | 2 | 18 | 34 |
|   | 3 | 19 | 37 |   | 2½ | 20 | 34 |
|   | 3½ | 18 | 36 |   | 6 | 16 | 32 |
|   | 4 | 21 | 38 |   | 7 | 15 | 32 |
|   | 7½ | 16 | 34 |   | 7½ | 18 | 32 |
|   | 8½ | 15 | 35 |   | 8 | 15 | 32 |
|   | 9 | 18 | 36 |   | 8½ | 18 | 31 |
|   | 9½ | 15 | 36 |   | 9 | 15 | 32 |
|   | 10 | 18 | 37 |   | 9½ | 19 | 31 |
|   | 10½ | 15 | 35 |   | 10½ | 19 | 32 |
|   | 11 | 20 | 36 |   | 14 | 17 | 33 |
|   | 12 | 19 | 36 |   | 16 | 19 | 33 |
|   | 13½ | 17 | 37 |   |   |   |   |

TEST 1 -continued

No. 1    contained 25 × 25 gm units
No. 2    contained 21 × 25 gm units
Chamber dimensions I.D. 280 × 280 × 280 mm

| No | Time (Days) | Temp ° C. | % r.h. |
|---|---|---|---|
| 3 | 0 | 19 | 61 |
|  | ½ | 18 | 47 |
|  | 1 | 20 | 45 |
|  | 4½ | 17 | 42 |
|  | 5½ | 15 | 42 |
|  | 6 | 19 | 41 |
|  | 6½ | 16 | 41 |
|  | 7 | 20 | 41 |
|  | 7½ | 18 | 41 |
|  | 8 | 21 | 40 |
|  | 9 | 20 | 41 |
|  | 9½ | 20 | 41 |

No. 3    contained 2 × 25 gm units

CONCLUSIONS

The water soluble film of the packages is hygroscopic as shown by the rapid drop to relative humidity in each of 3 tests.

Each test also shows that after a few days a moisture equilibrium is established between product and the immediate environment which is then constant.

A slightly more humid equilibrium was established with chamber No. 3 which had much fewer packages. As the chambers were all the same size and started at the same relative humidity this shows that level of the moisture equilibrium is a function of the quantity of product present, Although not a simple one.

TEST 2

| | |
|---|---|
| Objective | To establish that once the packages are brought to moisture equilibrium with the immediate environment, that the humidity level of the environment will be maintained without any humidifying medium |
| Method | The packages were placed in an hermetically sealed chamber together with a hygrometer and a constant humidity solution chosen to provide a high relative humidity at 20° C. (75% r.h.). The chamber was closed and left undisturbed for a few days to ensure that the desired humidity was established and was stable. The constant humidity solution was then removed, the chamber resealed and the humidity monitored over several days. |

Results

| Time (days) | Temp ° C. | % r.h. |
|---|---|---|
| Chamber No. 1 | | |
| 0 | | 61[a] |
| 1 | | 68 |
| 8 | | 76 |
| 0 | 20 | 71* |
| 2 | 19 | 71 |
| 3 | 19 | 71 |
| 6 | 14 | 71 |
| 6½ | 17 | 71 |
| 7 | 16 | 71 |
| 9 | 16 | 71 |
| Chamber No. 2 | | |
| 0 | 20 | 74 |
| 3 | 16 | 78 |
| 3½ | 20 | 74 |
| 4½ | 17 | 72 |
| 5 | 18 | 72 |
| 6 | 17 | 72 |

[a] At this point constant humidity solution removed
*the restart humidity drop from 76 to 71 was due to opening the chamber to remove humidity solution Constant humidity solution used was KBr saturated solution in water with excess salute. Each chamber contained 2 domes.

CONCLUSION

From the above we can see that once a limited hygroscopic product has been allowed to absorb moisture from the immediate environment and has established a moisture equilibrium with it, the environment relative humidity will be maintained by itself without any assistance.

Unlike earlier dart tests, the test was carried out at low humidity and in all cases rupture occurred at the seals, whereas this was an exception at high humidity.

It appears that at these conditions the seal has become the weakest point so that any difference between shape is masked. The seals rupturing first.

TEST 3

| | |
|---|---|
| Objective | To establish differences in impact resistance for water soluble film encapsulates at different humidity levels of the environment |
| Method | A number of packages were produced according to the process of the invention, some having a dome shape and some having a triangular shape. Some of the packages were conditioned according to the process of the invention until the packages reached equilibrium relative humidity at 70% RH, whereas the other packages were equilibrated in a relative RH of 33%. In more detail, the packages were exposed to their respective environments for 24 hours to reach moisture equilibrium, and were subjected individually to a falling dart impact. The dart was hemispherical in shape and was allowed to fall 615 mm onto the test specimen. After each impact, if there was no rupture, the process was repeated with an increased dart load. This process was repeated until rupture did occur. |

Results
The mean dart weight for rupture were as follows:

CONCLUSIONS

The results show a dramatic effect of conditioning the packages in an environment of raised relative humidity.

The invention is not limited to the embodiment hereinbefore described which may be varied in both detail and process step without departing from the spirit of the invention.

What is claimed is:

1. A process for producing a package containing a composition which package comprises a closed envelope of water soluble film, the process comprising the steps of:

forming the film to produce an open package having a recess adapted to receive the composition;

placing the composition within the recess;

sealing the package; and packing the package within a secondary pack, which secondary pack includes at least a partial moisture barrier, wherein the process includes an additional step of conditioning the sealed package after sealing in an environment of raised relative humidity, wherein the relative humidity is raised relative to the relative humidity of the atmosphere prior to sealing.

2. A process as claimed in claim 1 in which the conditioning environment has a relative humidity of greater than 50% at 20° C., and the relative humidity during forming, filling and sealing steps is in the region of 30 to 50% at 20° C.

3. A process as claimed in claim 1 in which the conditioning step is carried out prior to packaging the package within the secondary package.

4. A process for producing a package comprising a composition contained with a closed water soluble envelope, the process comprising the steps of:

moulding a first sheet of water soluble material to form at least one recess adapted to contain the composition;

placing the composition in the at least one recess;

placing a second sheet of water soluble material across the recess; and sealing the first sheet to the second sheet to form a continuous closed seal around the recess thereby closing the package, wherein the process includes an additional step of conditioning the closed package after sealing, for a period of time in an environment of raised relative humidity, wherein the relative humidity is raised relative to the relative humidity of the atmosphere prior to sealing.

5. A process as claimed in claim 4 in which the process includes an additional step of packaging the at least one package in a secondary pack which includes at least a partial moisture barrier, wherein the conditioning of the at least one package is carried out prior to the secondary packaging step.

6. A process as claimed in claim 4 in which the conditioning step is carried out during the secondary packaging step.

7. A process as claimed in claim 6 in which the secondary pack containing the package is sealed in the conditioning atmosphere.

* * * * *